United States Patent
McCormick et al.

(10) Patent No.: US 8,568,104 B2
(45) Date of Patent: Oct. 29, 2013

(54) FAST SET MATERIAL PROPORTIONER

(75) Inventors: Martin P. McCormick, Forest Lake, MN (US); William A. Weikel, Maple Grove, MN (US); Bret A. Deneson, Maple Grove, MN (US); David M. Larsen, Albertville, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 1493 days.

(21) Appl. No.: 10/533,329

(22) PCT Filed: Oct. 30, 2003

(86) PCT No.: PCT/US03/34471
§ 371 (c)(1),
(2), (4) Date: May 2, 2005

(87) PCT Pub. No.: WO2004/042484
PCT Pub. Date: May 21, 2004

(65) Prior Publication Data
US 2006/0071022 A1    Apr. 6, 2006

Related U.S. Application Data

(60) Provisional application No. 60/423,342, filed on Nov. 4, 2002.

(51) Int. Cl.
*F04B 41/06* (2006.01)

(52) U.S. Cl.
USPC ................................................ 417/5; 222/55

(58) Field of Classification Search
USPC ................. 417/5, 17, 19, 22, 26, 18, 38, 350;
222/55, 57, 63, 145.5, 145.7, 333,
222/145.6, 52, 14, 638, 639, 644, 61, 649,
222/137, 318, 383, 380, 340, 309

See application file for complete search history.

(56) References Cited

U.S. PATENT DOCUMENTS

| | | | | |
|---|---|---|---|---|
| 2,594,064 | A | 4/1952 | O'Leary | 103/5 |
| 2,643,614 | A | 6/1953 | Rosenkrans | 103/87 |
| 2,807,213 | A * | 9/1957 | Rosen | 92/5 R |
| 2,983,282 | A | 5/1961 | Bauer | 137/567 |
| 3,013,497 | A * | 12/1961 | Schneider | 417/339 |
| 3,097,764 | A * | 7/1963 | Loeser | 222/55 |
| 3,196,802 | A | 7/1965 | Matheny | 103/218 |
| 3,685,574 | A | 8/1972 | Worms | 165/22 |

(Continued)

FOREIGN PATENT DOCUMENTS

| | | |
|---|---|---|
| DE | 100 21 799 A1 | 11/2001 |
| EP | 1 256 375 A2 | 11/2002 |
| WO | WO01/60508 A | 8/2001 |

*Primary Examiner* — Devon Kramer
*Assistant Examiner* — Amene Bayou
(74) *Attorney, Agent, or Firm* — Douglas B. Farrow

(57) ABSTRACT

The proportioner (10) has a variable speed controlled DC motor (12) having a gearbox (14) and crankshaft (16) at either end which are connected to reciprocating piston pumps (18). The outputs (18a) of the two pumps (18) are fed to a manifold (22) where the pressure of each output is measured. The user sets a setpoint pressure (e.g. 1000 psi) and the controller (26) then compares the pressures of the two components and controls the higher of the two relative to the setpoint. Ratio assurance is monitored by continuing to look at both output pressures. If one side falls below a predetermined percentage of the setpoint (50% in the preferred embodiment), an alarm may be raised or operation stopped.

2 Claims, 2 Drawing Sheets

(56) References Cited

U.S. PATENT DOCUMENTS

| | | | |
|---|---|---|---|
| 3,738,428 A | 6/1973 | Ingro | 169/2 |
| 3,891,354 A | 6/1975 | Bosch | 417/216 |
| 4,547,128 A * | 10/1985 | Hayes | 417/2 |
| 4,558,992 A | 12/1985 | Hamano et al. | 417/250 |
| 4,613,059 A * | 9/1986 | Merkel | 222/52 |
| 4,789,100 A * | 12/1988 | Senf | 239/61 |
| 4,878,601 A * | 11/1989 | Flemming et al. | 222/137 |
| 4,989,756 A * | 2/1991 | Kagamihara et al. | 222/55 |
| 5,271,521 A | 12/1993 | Noss et al. | 222/1 |
| 5,277,333 A * | 1/1994 | Shimano | 222/14 |
| 5,305,917 A * | 4/1994 | Miller et al. | 222/63 |
| 5,326,233 A | 7/1994 | Mochizuki et al. | 417/350 |
| 5,332,125 A | 7/1994 | Schmitkons et al. | 222/1 |
| 5,678,299 A | 10/1997 | Mochizuki et al. | 29/596 |
| 5,992,686 A | 11/1999 | Cline et al. | 222/1 |
| 6,094,142 A | 7/2000 | Lu | 340/626 |
| 6,161,723 A * | 12/2000 | Cline et al. | 222/1 |
| 6,171,076 B1 | 1/2001 | Gannaway | 417/350 |
| 6,190,565 B1 * | 2/2001 | Bailey et al. | 210/744 |
| 6,227,821 B1 | 5/2001 | Leu et al. | 417/423 |
| 6,331,101 B2 | 12/2001 | Leu et al. | 417/423 |
| 6,692,572 B1 * | 2/2004 | Allen | 118/685 |

* cited by examiner

FAST SET MATERIAL PROPORTIONER

TECHNICAL FIELD

This application claims the benefit of U.S. application Ser. No. 60/423,342, filed Nov. 1, 2002.

BACKGROUND ART

Plural component proportioners for the mixing of materials such as polyureas and other foams are well known. Such devices have traditionally been simple mechanical proportioners or else complicated and heavy hydraulic powered units. While electrically operated units such as that shown in U.S. Pat. No. 3,196,802 have been used to proportion plural component materials, such are not designed for fast setting materials of the type mentioned which require precise control of both ratio and pressure.

DISCLOSURE OF THE INVENTION

It is therefore an object of this invention to provide a proportioner which is electrically powered, can be easily manufactured and serviced is easily transported and capable of precise metering of the two components.

Towards this end, the proportioner has a variable speed controlled DC motor having a gearbox and crankshaft at either end which are connected to reciprocating piston pumps. Such motors, gearboxes and cranks are well known for use in electrically powered airless paint sprayers such as those sold by the assignee of the instant invention under the trademark ULTRA. The outputs of the two pumps are fed to a manifold where the pressure of each output is measured. The user sets a setpoint pressure (e.g. 1000 psi) and the controller then compares the pressures of the first and second components (typically designated as the catalyst or A component and the resin or B component) and controls the higher of the two relative to the setpoint. Most materials today are designed for 1:1 ratios, that is, equal amounts of each component. Because of variations in viscosity and temperature, even though equal amounts of each component will be pumped (for mixing at the spray gun or other applicator) the pressure might be higher on one side or the other. Thus the controller continually compares the pressures and regulates the higher one to the setpoint.

Ratio assurance is monitored by continuing to look at both output pressures. If one side falls below a predetermined percentage of the setpoint (50% in the preferred embodiment), an alarm may be raised or operation stopped. Of course this threshold percentage may be varied.

These and other objects and advantages of the invention will appear more fully from the following description made in conjunction with the accompanying drawings wherein like reference characters refer to the same or similar parts throughout the several views.

BEST MODE FOR CARRYING OUT THE INVENTION

Figure 1:
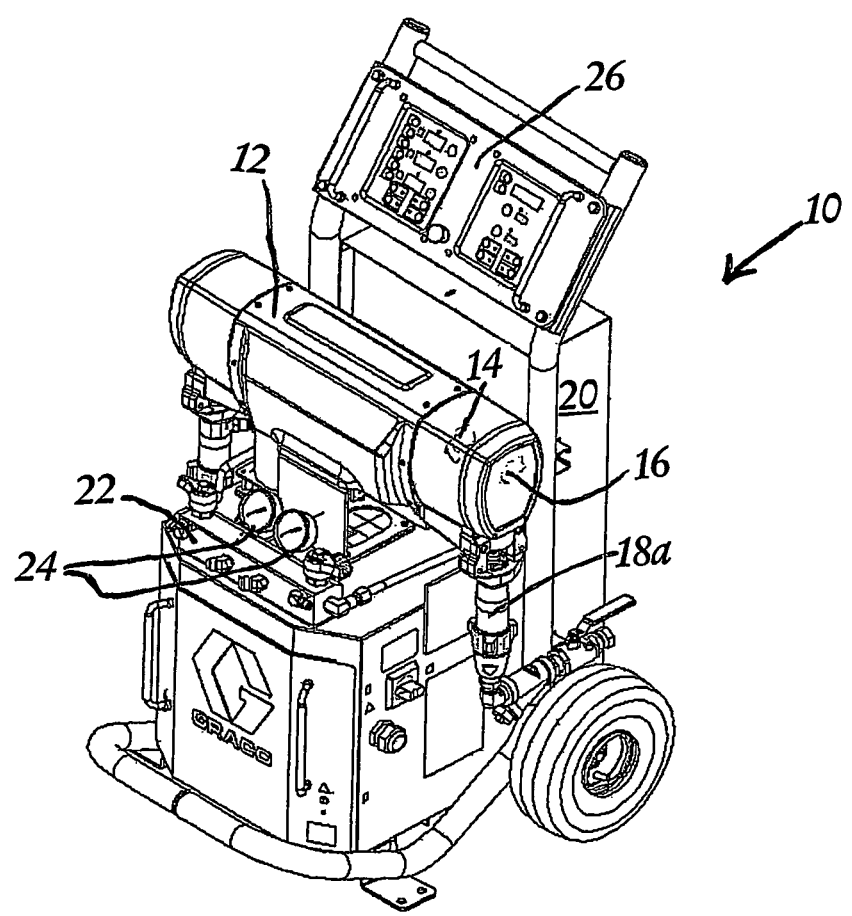
FIG. 1 is an isometric view of the front of the proportioner of the instant invention.
Figure 2:
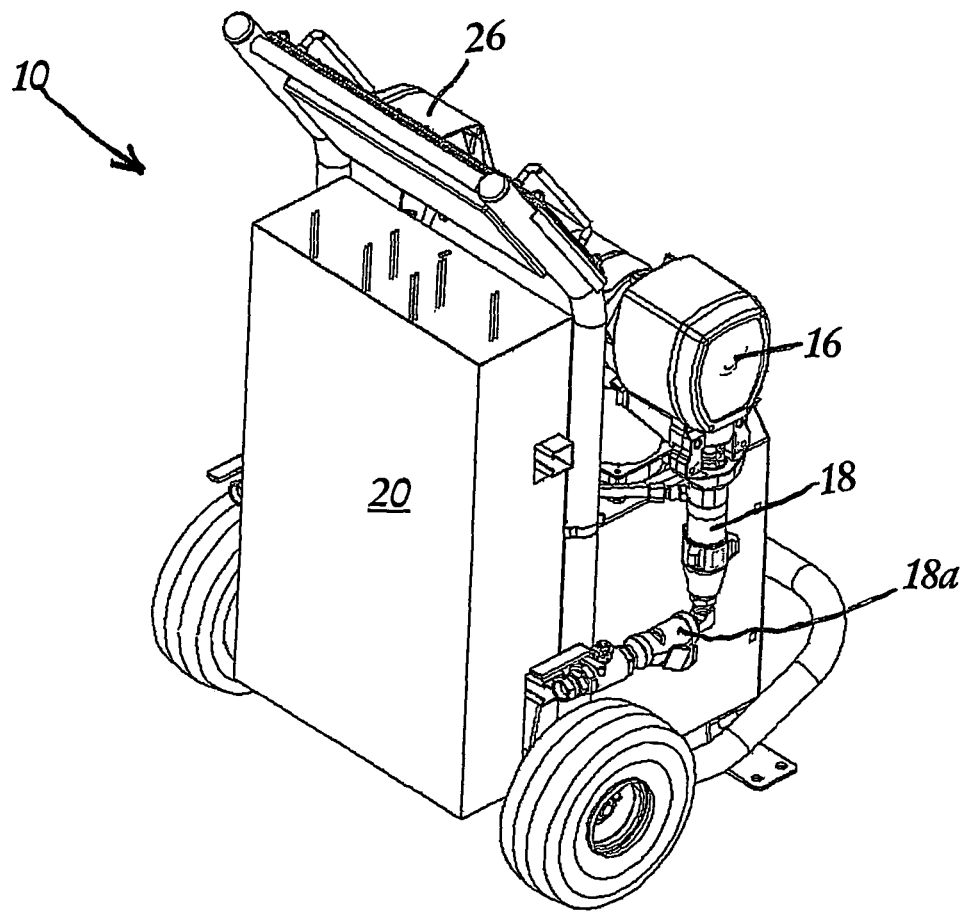
FIG. 2 is an isometric view of the rear of the proportioner of the instant invention.

The proportioner of the instant invention, generally designated 10, is shown in FIGS. 1 and 2. Towards this end, the proportioner 10 has a variable speed controlled DC motor 12 having a gearbox 14 and crankshaft 16 at either end which are connected to reciprocating piston pumps 18. Such motors, gearboxes and cranks are well known for use in electrically powered airless paint sprayers such as those sold by the assignee of the instant invention under the trademark ULTRA. The outputs 18a of the two pumps 18 are fed to heaters 20 and thence to a manifold 22 where the pressure of each output is measured by pressure sensors 24.

The user sets a setpoint pressure (e.g. 1000 psi) and the controller 26 then compares the pressures of the two components and controls the higher of the two relative to the setpoint. The DC motor control is of the type shown in U.S. Pat. No. 4,397,610, the contents of which are hereby incorporated by record.

Most materials today are designed for 1:1 ratios, that is, equal amounts of each component. Because of variations in viscosity and temperature, even though equal amounts of each component will be pumped (for mixing at the spray gun or other applicator) the pressure might be higher on one side or the other. Thus the controller 26 continually compares the pressures and regulates the higher one to the setpoint.

Ratio assurance is monitored by continuing to look at both output pressures. If one side falls below a predetermined percentage of the setpoint (50% in the preferred embodiment), an alarm may be raised or operation stopped. Of course this threshold percentage may be varied.

Ratio assurance is monitored by continuing to look at both output pressures. If one side falls below a predetermined percentage of the setpoint (50% in the preferred embodiment), an alarm may be raised or operation stopped.

It is contemplated that various changes and modifications may be made to the proportioner without departing from the spirit and scope of the invention as defined by the following claims.

The invention claimed is:

1. A proportioner for dispensing plural component materials, said proportioner comprising:

A variable speed electric motor having a shaft and first and second ends, said shaft extending from each of said ends;

a first reciprocating piston pump attached to said first motor end, said pump being connected to a source of a first material and having an output which has a first pressure;

a second reciprocating piston pump attached to said second motor end, said pump being connected to a source of a second material and having an output which has a second pressure, said pumps simultaneously pumping said materials to an applicator, wherein the materials being pumped from the first and second pump do not pass through another pump; and a controller with provision for a user-selectable pressure setpoint, said controller continually comparing said first and second pressures and regulating the higher of said pressures to said setpoint, said first and second pumps being the only pumps between said material sources and said outputs.

2. A proportioner for dispensing plural component materials, said proportioner comprising:

a variable speed electric motor having first and second ends;

a first reciprocating piston pump attached to said first motor end, said pump being connected to a source of a first material and having an output which has a first positive pressure;

a second reciprocating piston pump attached to said second motor end, said pump being connected to a source of a second material and having an output which has a second positive pressure, said pumps simultaneously pumping said materials to an applicator, wherein the materials being pumped from the first and second pump do not pass through another pump; and a controller with provision for a user-selectable pressure setpoint, said controller continually monitoring said first and second pressures and providing an alarm in the event one of said pressures falls to a predetermined percentage of said setpoint.

\* \* \* \* \*